(«United States Patent [19]
Pettijohn

[11] Patent Number: 5,322,911
[45] Date of Patent: Jun. 21, 1994

[54] POLYMERIZATION PROCESS EMPLOYING METAL HALIDE CATALYST AND POLYMER PRODUCED

[75] Inventor: Ted M. Pettijohn, Bartlesville, Okla.

[73] Assignee: Phillips Petroleum Company, Bartlesville, Okla.

[21] Appl. No.: 949,310

[22] Filed: Sep. 22, 1992

Related U.S. Application Data

[62] Division of Ser. No. 805,233, Dec. 11, 1991, Pat. No. 5,180,702.

[51] Int. Cl.⁵ .................. C08F 4/654; C08F 4/655; C08F 10/00
[52] U.S. Cl. ..................................... 526/125; 526/352
[58] Field of Search ........................................ 526/125

[56] References Cited

U.S. PATENT DOCUMENTS

| | | |
|---|---|---|
| 3,642,746 | 2/1972 | Kashiwa .............................. 260/88.2 |
| 3,812,089 | 5/1974 | Tashiro .............................. 260/93.7 |
| 4,006,101 | 2/1977 | Matsuura ............................. 252/429 |
| 4,071,674 | 1/1978 | Kashiwa et al. ...................... 526/125 |
| 4,298,713 | 11/1981 | Morita et al. ........................ 526/125 |
| 4,410,451 | 10/1983 | Dietz et al. .......................... 502/110 |
| 4,438,243 | 3/1984 | Kashiwa et al. ...................... 526/125 |
| 4,525,469 | 6/1985 | Ueda et al. .......................... 526/125 |
| 4,855,271 | 8/1989 | McDaniel et al. ................... 502/107 |
| 4,988,655 | 1/1991 | Mitchell et al. ................. 502/111 X |
| 5,024,982 | 6/1991 | Hawley et al. ....................... 502/110 |
| 5,091,353 | 2/1992 | Kioka et al. ......................... 526/125 |

OTHER PUBLICATIONS

"Modification of Catalysts for Propylene Polymerization: Alcohols and Lewis Bases", Journal of Polymer Science: Polymer Chemistry Edition, vol. 22, 3239–3246 (Sivak and Kissin 1984).

Primary Examiner—Edward J. Smith
Attorney, Agent, or Firm—Marianne H. Michel

[57] ABSTRACT

A polymerization catalyst is formed by producing a solution of a Group IIA or Group IIB halide and an alcohol; contacting the solution with an organometallic compound to form a soluble complex; and contacting the soluble complex with a halide ion exchanging source. An ester or an anhydride can also be combined with the halide solution or the soluble complex. The catalyst thus produced can be combined with an organometallic cocatalyst.

11 Claims, No Drawings

POLYMERIZATION PROCESS EMPLOYING METAL HALIDE CATALYST AND POLYMER PRODUCED

This is a divisional of copending application Ser. No. 07/805,233, filed Dec. 11, 1991, now U.S. Pat. No. 5,180,702.

BACKGROUND

The present invention relates to metal halide catalysts.

In the polymerization of alpha-olefins, it is known to use catalyst systems comprising a transition metal compound and an organometallic compound. It is further known that the productivity of such catalyst systems can generally be improved if the transition metal compound is employed in conjunction with a metal halide. Many of the prior art catalyst systems are relatively low in activity and, as a result, research continues in an effort to improve the catalyst systems with respect to production of olefin polymers.

In addition, these catalysts produce polymers of narrow molecular weight distribution. For many applications, such as extrusion and molding processes, it is highly desirable to have polymers which have a broad molecular weight distribution. Such polymers evidence excellent processability, i.e., they can be processed at a faster throughput rate with lower energy requirements with reduced melt flow perturbations.

SUMMARY OF THE INVENTION

It is an object of this invention to provide a catalyst system of high activity useful for the polymerization of olefins of broad molecular weight distribution.

It is another object of this invention to provide a method to prepare an improved catalyst system useful for the polymerization of olefins.

It is another object of this invention to provide a method for the polymerization of olefins with broad molecular weight distribution having improved processability.

In accordance with the invention, a catalyst is produced by admixing a metal halide selected from the group consisting of Group IIA and Group IIB halides and an alcohol to form a metal halide solution; combining said metal halide solution with an organometal compound, and thereafter combining the resulting composition with a halide ion exchanging source.

DETAILED DESCRIPTION OF THE INVENTION

Catalyst

The present invention is concerned with high productivity catalysts which employ Group IIA and Group IIB metal halides which are contacted with an alcohol and optionally an ester or an anhydride to form a solution; the solution is contacted with an organometallic compound to give a soluble complex; a solid precipitate is formed when the soluble complex is combined with a halide ion exchanging source. An organometal cocatalyst can be employed. An ester or anhydride may also be contacted when combining the halide ion exchanging source. The polymer produced by the catalyst exhibits broad molecular weight distribution.

The metal halide compound is selected from metal dihalides and metal hydroxyhalides and the metal of the metal halide compound is selected from Group IIA and Group IIB metals of the Mendeleev Periodic Table. As used herein by the term "Mendeleev Periodic Table" is meant the Periodic Table of the Elements as shown in the inside front cover of Perry, *Chemical Engineer's Handbook*, 4th Edition, McGraw Hill & Co. (1963).

As noted above, the metal halide compound is selected from metal dihalide compounds and metal hydroxyhalide compounds, and the metal of the metal halide compound is selected from Group IIA and Group IIB metals, such as for example beryllium, magnesium, calcium and zinc. Some suitable metal halide compounds include for example, beryllium dichloride, beryllium dibromide, beryllium hydroxyiodide, magnesium dichloride, magnesium bromide, magnesium hydroxychloride, magnesium diiodide, magnesium difluoride, calcium dichloride, calcium dibromide, calcium hydroxybromide, zinc dichloride, zinc difluoride, and zinc hydroxychloride.

Preferably, the metal halide employed in making the first catalyst component is selected from the group consisting of magnesium dihalides, magnesium hydroxyhalides, and mixtures thereof. Examples of what is meant by magnesium dihalides are $MgCl_2$, $MgF_2$, $MgI_2$, $MgBr_2$. Examples of what is meant by magnesium hydroxyhalides include $Mg(OH)Cl$, $Mg(OH)Br$, $Mg(OH)I$. It is also within the scope of the invention to use metal halides complexed with one or more electron donors, such as compounds of the formula $MgCl_2 nED$ wherein ED is electron donor. Examples of typical electron donors are water, ammonia, hydroxylamines, alcohols, ethers, carboxylic acids, esters, acid chlorides, amides, nitriles, amines, dioxane, and pyridine. Examples of some specific magnesium halide complexes include $MgCl_2.H_2O$, $MgCl_2.2H_2O$, $MgCl_2.6H_2O$, $MgCl_2.4H_2O$, $MgBr_2.2H_2O$, $MgBr.H_2O$, $MgBr_2.4H_2O$, $MgBr.6H_2O$, $MgI_2.8H_2O$, $MgI_2.6H_2O$, $MgCl_2.6NH_3$, $MgCl_{22}.NH_3$, $MgBr_2.2NH_3$, $MgI_2.6NH_3$, $MgI.NH_3$, $MgCl_2.2NH_2OH.2H_2O$, $MgCl_2.6CH_3OH$, $MgCL_2.6C_2H_5OH$, $MgCl_2.6C_3H_7OH$, $MgCl_2.6C_4H_9OH$, $MgBr_2.6C_3H_7OH$, $MgCl_2.CH_3OH$, $MgCl_2.(C_2H_5)_2O$, $MgCl_2.6CH_3CO_2H$, $MgCl_2.2CH_3CO_2C_2H_5$, $MgBr_2.2C_6H_5CO_2C_2H_5$, $MgBr_2.4CO(NH_2)_1$, and $MgI_2.6CH_3CONH_2$, $MgBr_2.4CH_3CN$, $MgCl_2.3C_2H_4(NH_2)_2$, $MgCl_2.2N(C_2H_4O)_3$, $MgCl_2.2C_6H_5NH_2.6H_2O$ and $MgBr_2.6C_6H_5NH_2$ and the like.

It is also possible to use mixed compositions containing the metal halide. Examples include compositions such as $MgCl_2.MgO.H_2O$, $MgCl_2.3MgO.7H_2O$, $MgBr_2.3MgO.6H_2O$, and the like. While metal hydroxyhalide compounds are known in the art, they are not as common and as readily available as metal dihalide compounds; therefore, metal dihalides are preferred.

It is currently preferred to use magnesium dihalides of the commercial variety which are conventionally called "anhydrous" but which are in fact magnesium dihalide hydrates containing 1 molecule or less of water per molecule of magnesium dihalide. "Commercial anhydrous" magnesium dichlorides are a typical example. Of the magnesium dihalides, magnesium dichloride is particularly preferred because it is readily available and relatively inexpensive and has provided excellent results.

It is also noted that various techniques for converting a metal halide compound to a fine particulate form, such as for example roll milling, reprecipitating, etc., can be used to prepare the metal halide compound for use according to the present invention and that such additional preparation of the metal halide compound promotes the reaction of the metal halide compound with the transition metal compound; however, it does not appear to make any difference in a catalyst of the present invention prepared from a composition of matter of the present invention if the metal halide compound is in a fine particulate form, that is, polymer productivity, for example, is not a function of the size of the particles of the metal halide compound. Preparation of metal hydroxyhalide compounds are described in K. Soga, S. Katano, Y. Akimoto and T. Kagiya, "Polymerization of alpha-Olefins with Supported Ziegler-type Catalysts", *Polymer Journal*, Vol. 2, No. 5, pp. 128-134 (1973).

Alcohols that can be used include either monohydroxy or polyhydroxy alcohols. Aliphatic or aromatic alcohols can be employed. The aliphatic alcohols can be saturated or unsaturated. Suitable monohydroxy alcohols are those containing 1 to 20 carbon atoms, preferably from 2 to 16 carbon atoms. Examples of suitable monohydroxy alcohols include methanol, ethanol, isopropanol, hexanol, 2-ethyl hexanol, octanol, decanol, dodecanol, hexadecanol, and mixtures thereof.

Suitable polyhydroxy alcohols include diols and glycerols. Suitable diols are diols containing 2 to 20 carbon atoms, preferably 1,2 diols containing from 2 to 16 carbon atoms. Examples of suitable diols include 1,2-ethanediol, 1,2-propanediol, 1,3-propanediol, 1,4-hexanediol, 1,2-octanediol, 1,10-decanediol, 1,12-dodecanediol, 1,2-hexadecanediol, 1,20-eicosanediol, and mixtures thereof.

The alcohol is present in an amount sufficient to form a solution with the metal halide. The amount required to form a solution will vary depending on the alcohol used and the metal halide present.

The moles of alcohol per mole of metal halide to be employed according to the invention is generally in the broad range of about 1 to about 30, preferably in the range of about 2 to about 20, and most preferably in the range of 3 to 15. Examples of amounts of especially preferred alcohols include moles of alcohol per mole of metal halide of greater than 4 when the alcohol is 1,2-hexadecanediol; greater than 5 for 1,2-octanediol; and greater than 10 for 1-octanol.

The metal halide and the alcohol are combined with a suitable dry solvent or diluent (i.e. one essentially free of water). Typical solvents or diluents include, for example, normally liquid hydrocarbons having 3 to 12 carbon atoms such as n-heptane, methylcyclohexane, toluene, xylenes, and mixtures thereof. Toluene is the preferred solvent.

Generally, the amount of solvent or diluent employed can vary over a broad range. Usually the amount of solvent or diluent per gram of metal halide is within the range of about 5 to about 300 grams, preferably in the range of about 10 to about 200 grams and most preferably from 10 to 100 grams.

The temperatures employed in the combination of the metal halide, the alcohol, and solvent can vary over a wide range, generally being in the range of about 0° C. to about 200° C., preferably from about 15° C. to 100° C., and most preferably from 20° C. to 75° C. The pressure employed can vary over a wide range, generally being in the range of about 0 to about 200 psig, preferably in the range of about 0 to about 100 psig, and most preferably in the range of 0 to 50 psig. Conditions are selected so that the reaction product will be in solution. The time of reaction can vary broadly from about 1 minute to about 72 hours, preferably from about 5 minutes to about 24 hours, and most preferably from 5 minutes to 10 hours.

In another embodiment of the invention, an ester and/or anhydride can also be contacted with the catalyst components. Esters that can be used include alkyl or aromatic esters of linear or cyclic carboxylic acids having from 1 to about 20 carbon atoms and carbonic acid. Examples include methyl formate, ethyl octanoate, n-butyl-eicosanoate, methyl anisate, ethyl benzoate, methyl-para-toluate, diethyl carbonate, methyl ethyl carbonate, di-(3-methylbutyl)carbonate, ethylene carbonate, diphenyl carbonate, and mixtures thereof. Ethyl benzoate and methyl-para-toluate are preferred due to excellent results and availability.

Suitable anhydrides that can be employed include, anhydrides containing a total of 2 to 20 carbon atoms per molecule. Exemplary anhydrides include decanoic anhydride, benzoic anhydride, phthalic anhydride, napthalic anhydride, 1-napthoic anhydride, hydroxy-acetic acid, 2-hydroxyoctanoic acid, and 2-hydroxyoctadecanoic acid, and mixtures thereof. Phthalic anhydride is preferred due to excellent results and availability.

The moles of ester and/or anhydride per mole of metal halide to be employed is in the broad range of about 1 to about 30, preferably in the range of about 2 to about 20, and most preferably in the range of 3 to 15.

An organometal compound is contacted with the solution of metal halide, alcohol, and solvent to form a soluble complex. As used herein the term "soluble complex" refers to the product resulting from the combination of the metal halide solution and the organometal. It is not intended to be bound by theory as to the nature of the composition. The organometal compound can be a compound selected from an element of Groups IA, IIA, IIB, and IIIA of the Mendeleev Periodic Table. Some typical examples of such compounds include lithium alkyls, Grignard reagents, dialkylmagnesium compounds, dialkylzinc compounds, and organoaluminum compounds.

It is presently preferred that the organometal used in preparing the catalyst system be an organoaluminum compound of the formula $AlR'_m Y_{3-m}$, wherein each $R'$ is a hydrocarbyl radical, each individually selected from the group consisting of alkenyl, alkyl, cycloalkyl, aryl, alkaryl, and aralkyl radicals containing 1 to 20 carbon atoms, Y is a monovalent radical selected from hydrogen and the halides, and m is a number in the range of 1 to 3.

Examples of specific compounds include trimethylaluminum (TMA), triethylaluminum (TEA), triisobutylaluminum (TiBA), tridodecylaluminum, trieicosylaluminum, tricyclohexylaluminum, triphenylaluminum, triisopropenylaluminum, tribenzylaluminum, diethylaluminum chloride, diethylaluminum hydride (DEAH), ethylaluminum dichloride, isopropylaluminum dibromide, diisobutylaluminum hydride (DiBAH), and mixtures thereof.

Organoaluminum halides are most preferred. Suitable types of organoaluminum halides are selected from dihydrocarbylaluminum halides and hydrocarbylaluminum dihalides, and mixtures thereof. Examples include dimethylaluminum bromide, diethylaluminum chloride (DEAC), diisobutylaluminum bromide, didodecylaluminum chloride, dieicosylaluminum bromide, ethylaluminum dichloride (EADC), ethylaluminum sesquichloride (EASC), and mixtures thereof.

Preferably the organometallic compound has been dissolved in a hydrocarbon solvent.

The moles of organometal compound per mole of metal halide to be employed is generally in the broad range of about 1 to about 60, preferably in the range of about 2 to about 50, and most preferably in the range of 3 to 30.

The temperatures employed in forming the soluble complex can vary over a wide range, generally being in the range of about 0° C. to about 150° C., preferably from about 20° C. to 100° C., and most preferably from 20° C. to 75° C. The pressure employed can vary over a wide range, generally being in the range of about 0 to about 200 psig, preferably in the range of about 0 to about 100 psig, and most preferably in the range of 0 to 50 psig. Conditions are selected so that the reaction product will be in solution. The time of reaction can vary broadly from about 1 minute to about 72 hours, preferably from about 5 minutes to about 24 hours, and most preferably from 5 minutes to 10 hours.

Following the combination of the organometallic compound and the solution of the metal halide and the alcohol, the composition is generally stirred or agitated for a sufficient time to insure complete mixing of the components, generally from 15 minutes to 5 hours.

The soluble complex thus formed, is then reacted with a halide ion exchanging source to produce a precipitate. The halide ion exchanging source is selected from the halide containing compounds of elements of Groups IVA and VA of the Mendeleev Periodic Table. Further according to the invention, the Group IVA and VA halide containing compounds can be combined with transition metal halides of Groups IVB and VB and organic acid halides. The term halide ion exchanging source is used herein to denote those compounds capable of adding halogen to the soluble complex and promoting the catalytic activity for olefin polymerization.

Currently preferred halide ion exchanging sources include halides of Group IVA and VA transition metals, such as titanium tetrachloride, vanadium oxychloride, zirconium oxychloride, and zirconium tetrachloride, and combinations of Group IVA and VA halides with the halides of Group IVB and VB elements, such as $COCl_2$, $PCl_3$, $SiCl_4$, $SnCl_4$, $CCl_4$ and acid chlorides of the formula $R'COCl$ where $R'$ is an aliphatic or aromatic radical preferably containing 1 to 20 carbon atoms. Particularly preferred halide ion exchanging sources include titanium tetrahalides, e.g. titanium tetrachloride; and combinations of titanium tetrahalides and halogenated silicon compounds, e.g. silicon tetrachloride and trichlorosilane.

The soluble complex can be contacted with the halide ion exchanging source neat or in a liquid medium. Generally, the soluble complex is contacted in a liquid diluent containing the halide ion exchanging source. Examples of suitable diluents include n-pentane, n-heptane, cyclohexane, benzene, toluene, and m-xylene.

The temperature employed in contacting the soluble complex and the halide ion exchanging source is generally in the range of about −25° C. to about 250° C., preferably about 0° C. to about 200° C., and most preferably from 0° C. to 100° C. The pressure employed can vary over a wide range, generally being in the range of about 0 to about 200 psig, preferably in the range of about 0 to about 100 psig, and most preferably in the range of 0 to 50 psig. The time of reaction can vary broadly from about 1 minute to about 72 hours, preferably from about 5 minutes to 24 hours, and most preferably from 5 minutes to 10 hours.

While the moles of halide ion exchanging source per mole of metal halide can be selected over a wide range, generally about 0.01 to about 200 will be employed, preferably from about 0.1 to about 20, and most preferably from 0.1 to 10. Following the treatment of the soluble complex with the halide ion exchanging source to form a solid catalyst, the surplus halide ion exchanging source can be removed by washing with a dry liquid of the type used in the previous step. The resulting product can be stored under dry nitrogen until use.

Cocatalyst

In the polymerization of olefins, the inventive catalyst system can be used with a suitable cocatalyst of the type generally used with titanium-containing olefin polymerization catalysts. Typical examples include organometallic compounds of Groups I, II, and III of the Mendeleev Periodic Table, i.e. alkali metal alkyls or aryls, dialkylmagnesium, dialkylzinc, Grignard reagents, and organoaluminum compounds.

It is presently preferred that the cocatalyst used in preparing the catalyst system be an organoaluminum compound of the formula $AlR'_m Y_{3-m}$, wherein each $R'$ is a hydrocarbyl radical, each individually selected from the group consisting of alkenyl, alkyl, cycloalkyl, aryl, alkaryl, and aralkyl radicals containing 1 to 20 carbon atoms, Y is a monovalent radical selected from hydrogen and the halides, and m is a number in the range of 1 to 3.

Examples of specific compounds include trimethylaluminum (TMA), triethylaluminum (TEA), triisobutylaluminum (TiBA), tridodecylaluminum, trieicosylaluminum, tricyclohexylaluminum, triphenylaluminum, triisopropenylaluminum, tribenzylaluminum, diethylaluminum chloride, diethylaluminum hydride (DEAH), ethylaluminum dichloride, isopropylaluminum dibromide, diisobutylaluminum hydride (DiBAH), and mixtures thereof. For the polymerization of monomers consisting predominantly of ethylene, it is currently preferred to use a trialkylaluminum cocatalyst, and most preferably triethylaluminum.

The amount of cocatalyst employed in the catalyst system during the polymerization process can vary widely. Generally, the moles of organometal cocatalyst per mole of halide ion exchanging source employed in forming the inventive catalyst system is about 0.1 to about 500, preferably from about 1 to about 100, and most preferably from 1 to 50.

If desired, the catalyst system can be mixed with a particulate diluent such as silica, silica-alumina, silica-titania, magnesium dichloride, magnesium oxide, polyethylene, polypropylene, and poly(phenylene sulfide), prior to using the composition in a polymerization process. The weight ratio of diluent to catalyst can range from about 0.01 to about 1000.

Reactants

The inventive catalyst system is useful for the polymerization of olefins. Typical polymerizable olefins include the aliphatic monoolefins having 2 to 18 carbon atoms. The term polymerization is used herein to include both homo- and co-polymerization. In copolymerization other polymerizable monomers can be employed with the olefins, such as conjugated and nonconjugated dienes.

Suitable olefins include ethylene, propylene, 1-butene, 1-hexene, 4-methyl-1-pentene, styrene, 1,3-butadiene, isoprene, 1,5-hexadiene, trans-1,3-pentadiene, trans-1,3-hexadiene, trans-2-methyl-1,3-pentadiene, trans-3-methyl-1,3-pentadiene, 2,3-dimethyl-1,3-butadiene, trans-trans-2,4-hexadiene and mixtures containing 2 or more polymerizable unsaturated hydrocarbons. A particular group of olefins to be polymerized according to the invention includes unsaturated hydrocarbons having 2 to 6 carbon atoms and having at least one polymerizable ethylenic double bond. The inventive catalyst is particularly well suited for the preparation of ethylene homopolymers and copolymers which contain at least 90 mole percent, and preferably at least 95 mole percent ethylene. In one especially preferred embodiment 99 to 99.6 mole percent ethylene is used and 0.4 to 1 mole percent of a 4 to 10 carbon atom comonomer is used; in this embodiment hexene is a particularly desirable comonomer because of cost, availability and efficacy.

The polymerization reaction can be carried out in the presence of a solvent or a diluent. Suitable as the solvent for the instant reaction system are inert hydrocarbons such as n-butane, isobutane, n-pentane, n-hexane, n-heptane, isooctane, cyclohexane, methylcyclohexane, benzene, toluene, xylene, tetralin, decalin, and other aliphatic, alicyclic, aromatic hydrocarbons, or mixtures thereof. The polymerization can be carried out in gas phase in the absence of solvent or diluent.

Polymerization Conditions

The catalyst system of this invention, that is the catalyst and cocatalyst, can be employed in a batchwise, semi-continuous, or in a continuous polymerization process. Generally, the present polymerization reaction can be carried out at a temperature in the range of about 0° C. to about 200° C., preferably a temperature of about 25° C. to about 150° C., and most preferably from 25° C. to 100° C. Polymerization pressure can vary depending on the type of monomer, the catalyst activity, the desired degree of polymerization, etc. Polymerization pressure can be subatmospheric or superatmospheric pressure up to about 300 atmospheres, preferably from atmospheric pressure up to about 100 atmospheres, and most preferably from atmospheric pressure up to 50 atmospheres. Contacting time for the catalyst and the olefins can vary broadly, generally up to about one week, more preferably from about 1 minute up to about 24 hours, and most preferably from 1 minute up to 5 hours.

Generally, when using a solvent or diluent in the instant polymerization reaction, it is convenient to introduce olefin into a dispersion containing the catalyst system of the present invention in the solvent or diluent. The catalyst composition can be added in its whole amount to the polymerization system at the start or it can be added portion-wise over the period for the polymerization.

In a batch process of polymerizing ethylene, for example, a stirred autoclave is conditioned by purging with dry nitrogen and then with the hydrocarbon diluent that is to be employed in the polymerization process such as isobutane, for example. Generally, although order is immaterial, the cocatalyst is charged through an entry port followed by the catalyst. After closing the port, hydrogen, if used, is added, and the hydrocarbon diluent is then charged.

The reactor can then be heated to the desired reaction temperature, e.g. about 50° to about 120° C., the ethylene is admitted and maintained at a partial pressure within a range of about 0.5 to about 5.0 MPa (70-725 psig). At the end of the reaction period, generally about 1 hour for bench scale testing, the polymerization reaction is terminated by venting unreacted olefin and diluent. The reactor is then opened and the free-flowing white ethylene polymer can be collected and dried.

In a continuous process, for example, a suitable reactor such as a loop reactor is continuously charged with suitable quantities of solvent or diluent, catalyst, cocatalyst, olefin, and hydrogen, if used. The contact between the catalyst system and monomer can be effected by various ways. For example, the olefin can be contacted with the catalyst in the form of a fixed bed, a slurry, a fluid bed, or a movable bed.

The polymerization reaction can be carried out in the presence of molecular hydrogen to regulate the molecular weight of the olefin polymers, as known in the art.

Products

The reactor product is continuously or intermittently withdrawn, and the polymer recovered, e.g. flashing diluent and unreacted olefin and drying the product. In order to recover a produced polymer from the polymerization system, the crude polymerization product is for example taken up and subjected to solvent extraction, hot filtration under a pressure or centrifugal separation to yield a substantially pure polymeric product. A selection of the polymerization conditions for the process of the present invention, as well as the method for the recovery and purification of the polymeric product will be understood by those skilled in the art from the conventional low or modest pressure polymerization processes for olefins.

The following examples will serve to show the present invention in detail by way of illustration and not by way of limitation.

EXAMPLE I

The catalyst used in the following Runs was prepared by charging toluene and a solution prepared by combining 94 mg $MgCl_2$, 732 mg 1,2-octanediol, and 5 mL toluene in a reaction vessel at ambient temperature. A clear, colorless solution was formed to which 6.1 ml of 1.8M DEAC (in toluene) solution was added. The resulting solution remained clear and colorless. The addition of 0.22 mL $TiCl_4$ to the solution produced a red-brown solid. The reaction was continued for 1 hour at ambient temperature. The resulting solid catalyst was washed, recovered, and dried. The catalyst yield was 570 mg and contained 17% Ti by weight.

The polymerization reactions in example I were conducted in a 1-gal stirred autoclave. Catalyst and cocatalyst were charged to a dry reactor under counterflow of ethylene at ambient temperature. The reactor was sealed and ethylene flow stopped. Two liters of isobutane were added as reaction solvent. The reactor temperature was increased to 90° C. and hydrogen and ethylene were admitted. The reaction temperature and ethylene pressure were maintained for 1 hour. The solvent was then removed and the polymer collected as a dry fluff.

The polymerization reactions were run at 90° C. for 1 hour. The results and variables are summarized below.

Q is mg of catalyst used in the polymerization. mmol Al is the mmoles of cocatalyst as Al.

H$_2$ is the partial pressure of hydrogen, ΔP(H$_2$), as psig.
C$_6$= is the partial pressure of hexene.
Pressure is the total pressure.
Activity is expressed as grams of polymer per gram of titanium per hour.
MI is melt index, g/10 minutes, ASTM D1238-65T, conditions E.
HLMI is high load melt index, g/10 minutes, ASTM D1238-65T, condition F.
SR is shear response and is the ratio of HLMI/MI.
Density is g/mL.
HI is heterogeneity index and is equal to Mw/Mn.
Mw is the weight average molecular weight.
Mn is the number average molecular weight.

TABLE I

| Run | Q | mmol Al | H$_2$ | C$_6$= | Pressure | Activity | MI | HLMI | SR | Density | HI | Mw/1000 |
|---|---|---|---|---|---|---|---|---|---|---|---|---|
| 1 | 20 | 0.44 TEA | 47 | 0 | 538 | 122,000 | 0.04 | 3.56 | 89 | 0.9572 | 12 | 251 |
| 2 | 20 | 0.44 TEA | 47 | 90 | 517 | 95,100 | 0.21 | 10.10 | 48 | 0.9382 | 13 | 237 |
| 3 | 5 | 0.55 TEA | 47 | 0 | 540 | 161,000 | 0.06 | 3.00 | 50 | 0.9567 | 7.3 | 263 |
| 4 | 10 | 0.55 TEA | 47 | 45 | 543 | 179,000 | 0.16 | 6.80 | 43 | 0.9479 | 6.4 | 195 |
| 5 | 10 | 0.55 TEA | 47 | 90 | 540 | 130,000 | 0.15 | 6.30 | 42 | 0.9423 | 12 | 245 |
| 6 | 10 | 0.55 TEA | 47 | 135 | 540 | 54,800 | 0.52 | 30.00 | 58 | 0.9334 | 14 | 159 |
| 7 | 20 | 0.6 DEAC | 47 | 0 | 545 | 8,530 | 0.06 | 2.78 | 46 | 0.9548 | 7.0 | 261 |
| 8 | 10 | 0.55 TEA | 25 | 0 | 330 | 113,000 | 0.12 | 7.07 | 59 | 0.9583 | — | — |
| 9 | 10 | 0.55 TEA | 25 | 0 | 330 | 101,000 | 0.14 | 7.39 | 53 | 0.9574 | 6.5 | 224 |
| 10 | 10 | 0.55 TEA | 25 | 0 | 330 | 76,300 | 0.20 | 9.00 | 45 | 0.9589 | 6.7 | 213 |
| 11 | 10 | 0.55 TEA | 50 | 0 | 360 | 112,000 | 0.36 | 20.10 | 56 | 0.9618 | 8.3 | 219 |
| 12 | 10 | 1.00 TEA | 25 | 0 | 330 | 28,800 | 0.37 | 18.40 | 50 | 0.9607 | 7.6 | 172 |
| 13 | 10 | 0.22 TEA | 47 | 0 | 500 | 15,000 | 0.06 | 2.38 | 40 | 0.9562 | 7.0 | 299 |
| 14 | 10 | 0.55 TEA | 47 | 0 | 500 | 105,000 | 0.15 | 6.20 | 41 | 0.9561 | 6.4 | 215 |
| 15 | 10 | 1.1 TEA | 47 | 0 | 500 | 130,000 | 0.38 | 12.24 | 32 | 0.9596 | 5.8 | 182 |
| 16 | 10 | 3.3 TEA | 47 | 0 | 500 | 208,000 | 0.60 | 21.18 | 35 | 0.9582 | 5.1 | 150 |

Table I demonstrates that useful catalyst systems are produced by reacting a metal halide, an alcohol, an organoaluminum compound and a transition metal compound in conjunction with an organometal cocatalyst. Good catalyst activity for producing polymer with broad molecular weight distribution is indicated by HI values greater than 7.0 and shear response values greater than 40. Triethylaluminum is especially effective as cocatalyst. Activities as high as 179,000 gPE/g-Ti/hr were obtained.

Runs 1-6 demonstrate the effect of varying the amount of hexene as comonomer. Hexene is incorporated as indicated by the decreasing density.

Run 7 demonstrates that a halogen containing aluminum alkyl can be used as cocatalyst.

Runs 8-11 demonstrate the effect of varying the amount of hydrogen present. The MI, HLMI, and density increase in a typical response to increasing hydrogen.

Runs 8-10 demonstrate the run to run reproducibility of the catalyst system.

Comparative Runs 13-16 used a MgCl$_2$ based catalyst which was produced without using alcohol. The catalyst employed in Runs 13-16 was a catalyst sold by Catalyst Resources, Inc. which was prepared by a process of the general type disclosed in U.S. Pat. Nos. 4,363,746; 4,325,837; and 4,326,988 and contained about 12 weight percent titanium. The catalyst was one which was prepared by forming a solution of titanium tetraethoxide and magnesium chloride and precipitating a solid from that solution by the addition of ethylaluminum sesquichloride under conditions such that prepolymer was deposited upon the solid. The resulting solid was then contacted with titanium tetrachloride. Such catalysts generally contain about 1 to 30 weight percent prepolymer, more typically about 4 to about 10 weight percent prepolymer. A 15 weight percent solution of TEA in heptane was used as the cocatalyst.

In the comparative Runs 13-16, the HI values of 5.0-7.0 and shear response values between 32-41 indicate a polymer of narrow molecular weight distribution compared to the inventive catalyst system.

While this invention has been described in detail for the purpose of illustration, it is not to be construed as limited thereby, but is intended to cover all changes and modifications within the spirit and scope thereof.

That which is claimed is:

1. A polymerization process comprising contacting at least one alpha-olefin monomer with a catalyst and a cocatalyst under polymerization conditions:

wherein said catalyst is produced by a process comprising:

(1) contacting a magnesium dihalide with 1,2-octanediol to form a metal halide solution;

(2) contacting the solution of (1) with an organoaluminum compound to form a complex in solution; and (3) contacting the complex of (2) with a titanium tetrahalide compound; and wherein said cocatalyst comprises an organometallic compound, wherein the metal in the organometallic compound is selected from Groups IA, IIA, IIB, and IIIA.

2. A process according to claim 1 wherein said polymerization conditions comprise: a temperature of about 0° to about 200° C., a pressure up to 300 atmospheres, and for a time of up to a week.

3. A process according to claim 1 wherein said at least one monomer comprises ethylene.

4. A process according to claim 3 wherein said at least one monomer further comprises hexene.

5. A process according to claim 1 wherein said cocatalyst is selected from the group consisting of organoaluminum compounds represented by the formula AlR'$_m$Y$_{3-m}$, wherein each R' is a hydrocarbyl radical, each individually selected from the group consisting of alkyl, cycloalkyl, aryl, alkaryl, and aralkyl radicals containing 1 to 20 carbon atoms, Y is a monovalent radical selected from hydrogen and the halides, an m is a number in the range of 1 to 3.

6. A process according to claim 1 wherein said cocatalyst is present in an amount in the range of about 0.1 moles to about 500 moles of organometallic compound per mole of halide ion exchanging source.

7. A process for the polymerization of ethylene comprising contacting said ethylene with a catalyst and a cocatalyst under conditions comprising:

a temperature of 25° C. to 100° C.; a pressure of atmospheric up to 50 atmospheres; and a time of 5 minutes up to 5 hours;

wherein said catalyst is prepared by a process comprising;

(1) contacting magnesium dichloride with 1,2-octanediol to form a magnesium dichloride solution;

(2) contacting the solution of (1) with diethylaluminum chloride to form a complex in solution;

(3) contacting the complex of (2) with titanium tetrachloride to form said catalyst; and wherein said 1,2-octanediol is present in an amount in the range of 3 to 15 moles of alcohol per mole of magnesium dichloride;

said diethylaluminum chloride is present in an amount in the range of 3 to 30 moles of diethylaluminum chloride per mole of magnesium chloride;

said titanium tetrachloride is present in an amount in the range of 0.1 to 10 moles of titanium tetrachloride per mole of magnesium dichloride wherein said cocatalyst comprises an organometallic compound, wherein the metal in the organometallic compound is selected from Groups IA, IIA, IIB, and IIIA.

8. A process according to claim 7 further comprising contacting said catalyst with hexene.

9. A process according to claim 7 wherein said cocatalyst is selected from the group consisting of organoaluminum compounds represented by the formula $AlR'_m Y_{3-m}$, wherein each R' is a hydrocarbyl radical, each individually selected from the group consisting of alkyl, cycloalkyl, aryl, alkaryl, and aralkyl radicals containing 1 to 20 carbon atoms, Y is a monovalent radical selected from hydrogen and the halides, an m is a number in the range of 1 to 3.

10. A process according to claim 9 wherein said cocatalyst is triethylaluminum.

11. A process according to claim 7 wherein said cocatalyst is present in an amount in the range of about 1 moles to about 100 moles of organometallic compound per mole of halide ion exchanging source.

* * * * *